(No Model.)
W. LOUDEN.
HOISTING SINGLE TREE.
No. 315,423. Patented Apr. 7, 1885.
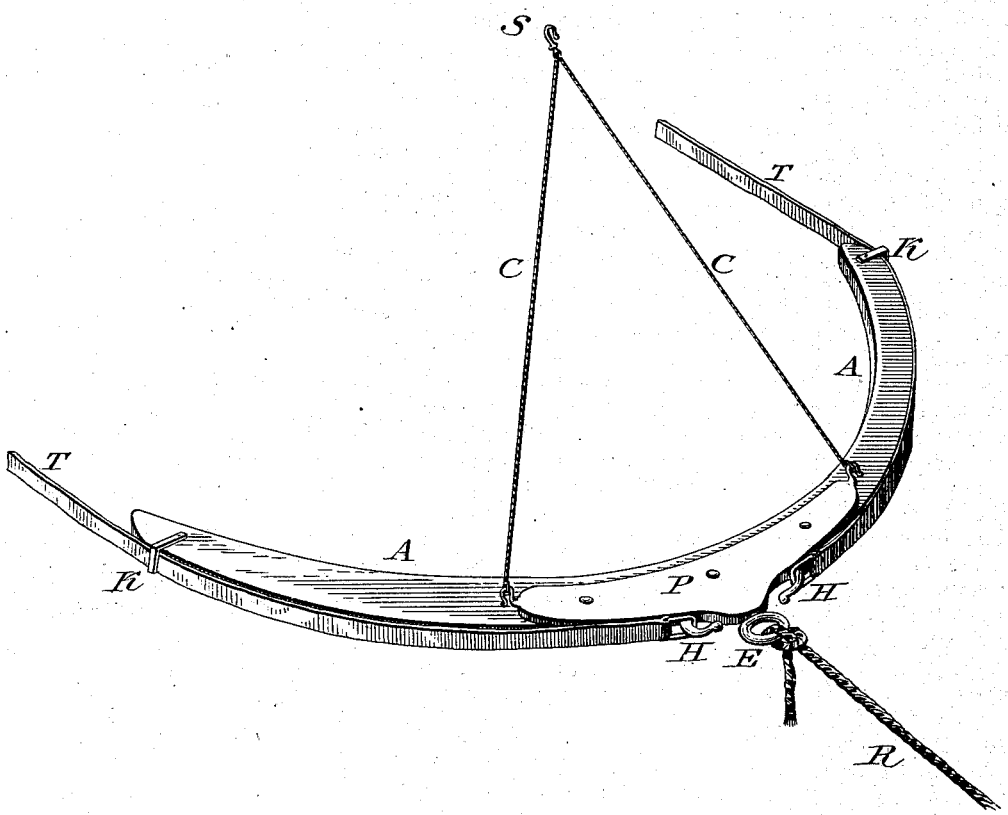
Witnesses:
Inventor:
William Louden,

UNITED STATES PATENT OFFICE.

WILLIAM LOUDEN, OF FAIRFIELD, IOWA.

HOISTING SINGLE-TREE.

SPECIFICATION forming part of Letters Patent No. 315,423, dated April 7, 1885.

Application filed February 18, 1885. (No model.)

*To all whom it may concern:*

Be it known that I, WILLIAM LOUDEN, of Fairfield, in the county of Jefferson and State of Iowa, have invented certain new and useful Improvements in Hoisting Single-Trees; and I do hereby declare the following to be a full, clear, and exact description of the invention, such as will enable others skilled in the art to which it pertains to make and use it, reference being had to the accompanying drawing, which forms part of this specification.

My invention relates to an improvement in hoisting single-trees; and it consists in a novel way of constructing and arranging a single-tree, and of attaching it to the draft traces or tugs of any ordinary harness, so that without shortening the draft traces or tugs the single-tree will be held closer to the horse, and will be kept from dropping against the horse's legs by means of suspending straps or cords attached to the harness above.

The figure is a top or plan view of my single-tree, showing the attachment of the hoisting-rope R, suspending-cords C C, and the draft-traces of the harness T T. Preferably the single-tree is made of bent wood; but it may be made of other material or in other shapes. Eyes or keepers K K are placed at or near each end of the single-tree, and through these eyes or keepers the draft-traces T T of the harness are passed. At or near the center of the single-tree a metal plate, P, is bolted or riveted to it. This metal plate or casting P is provided with hooks or projections H H, to which the traces T T are secured, and also a swivel hook or eye, E, to which the hoisting-rope R is fastened. This plate or casting extends along the single-tree each way from the center, so as to strengthen it, and at each end it is provided with an eye or hook, into which the suspending-cords C C are secured. These cords or straps C C extend up over the horse's hips, and are united by the hook or snap S, which is hooked or otherwise fastened to the harness on the horse's back.

It will be readily seen that a single-tree constructed, arranged, and attached in the manner described will be held up closely to the horse, and that the horse can back or turn around short without his heels striking against the single-tree or getting his feet over the traces.

The swivel eye or hook E will readily let kinks out of the rope, and will also prevent the rope from becoming untwisted by reason of the horse turning across it. The single-tree is easily attached and detached, and requires no special adjustment of the harness to fit it. It is simple and inexpensive to make, and by its use the operation of hoisting hay or other material is greatly facilitated. It may also be used, if desired, for any other purpose for which single-trees are commonly used.

I do not, however, limit myself to any particular form in the details of the construction or arrangement, for the different parts may be varied or changed without departing from the spirit of my invention.

Having thus described my invention, I claim—

1. The single-tree A, provided with eyes or keepers at or near its ends K K, through which the harness-traces pass, and the hitching-hooks H H, or their equivalents, placed at or near its center, and to which the harness-traces may be attached, substantially as shown and described.

2. The single-tree A, provided with the plate or casting P, having the hooks H H, or their equivalents, and the eye or hook E, for the purpose shown and described.

3. The single-tree A, constructed and arranged substantially as set forth, in combination with a suspending cord or strap, or with suspending cords or straps, substantially as and for the purpose set forth.

4. The combination and arrangement of the single-tree A, suspending-cords C C, and the hook or snap S, substantially as shown and described.

5. The plate P, bolted or riveted to the single-tree A, and having eyes or hooks, to which the suspending-cords C C may be attached, substantially as herein shown and described.

WILLIAM LOUDEN.

Witnesses:
R. B. LOUDEN,
ANDREW LOUDEN.